United States Patent
Nayak et al.

(10) Patent No.: US 6,594,118 B1
(45) Date of Patent: Jul. 15, 2003

(54) SUSPENSION SYSTEM FOR A HEAD-CARRIAGE ASSEMBLY FOR A MAGNETIC TAPE DRIVE

(75) Inventors: Ashok B. Nayak, Glendora, CA (US); James M. Decot, Fountain Valley, CA (US)

(73) Assignee: Seagate Removable Storage Solutions LLC, Scotts Valley, CA (US)

( * ) Notice: Subject to any disclaimer, the term of this patent is extended or adjusted under 35 U.S.C. 154(b) by 319 days.

(21) Appl. No.: 09/684,664

(22) Filed: Oct. 10, 2000

Related U.S. Application Data
(60) Provisional application No. 60/180,041, filed on Feb. 3, 2000.

(51) Int. Cl.[7] .................................................. G11B 5/55
(52) U.S. Cl. ........................................................ 360/261.1
(58) Field of Search ............................... 360/261.1, 291

(56) References Cited

U.S. PATENT DOCUMENTS

| | | | | |
|---|---|---|---|---|
| 5,731,935 A | * | 3/1998 | Lian et al. | 360/291 |
| 5,739,984 A | * | 4/1998 | Eckberg | 360/261.1 |
| 5,949,619 A | * | 9/1999 | Eckberg et al. | 360/291 |
| 6,078,483 A | * | 6/2000 | Anderson | 360/261.1 |
| 6,333,838 B1 | * | 12/2001 | Anderson | 360/261.1 |
| 6,404,598 B1 | * | 6/2002 | Nayak et al. | 360/291 |
| 6,411,474 B1 | * | 6/2002 | Anderson | 360/291 |
| 6,469,860 B1 | * | 10/2002 | Hedding et al. | 360/75 |

FOREIGN PATENT DOCUMENTS

| JP | 2000-36111 A | * | 2/2000 |
|---|---|---|---|

* cited by examiner

*Primary Examiner*—Jefferson Evans
(74) *Attorney, Agent, or Firm*—McDermott, Will & Emery (57) ABSTRACT

A head positioning apparatus for positioning a magnetic head in a multi-track tape drive is provided. The apparatus has a voice-coil, a movable carriage supporting the magnetic head and the voice coil, and a center magnetic pole housed in an interior of the voice coil. A pair of outer magnetic poles are positioned opposite each other about the voice coil. First and second flexures are each attached at opposing ends to the outer magnetic poles and in a central portion to the movable carriage. Each of the first and second flexures have one slot near where the first and second flexures are attached to the outer magnetic poles and a pair of slots positioned opposite each other about the area where the first and second flexures are attached to the movable carriage. The first and second flexures each have a plurality of reduced thickness areas and a plurality of increased thickness areas. Each of the increased thickness areas is positioned between adjacent ones of the reduced thickness areas. Each end of the first and second flexures has a plurality of holes for attaching the flexure to the outer magnetic pole and a plurality of holes in the central portion for attaching the flexure to the movable carriage.

20 Claims, 5 Drawing Sheets

SUSPENSION SYSTEM FOR A HEAD-CARRIAGE ASSEMBLY FOR A MAGNETIC TAPE DRIVE

CROSS REFERENCE TO RELATED APPLICATION

This application claims the benefit of U.S. Provisional Application No. 60/180,041, filed Feb. 3, 2000, the contents of which are hereby incorporated by reference.

BACKGROUND OF THE INVENTION

1. Field of the Invention

The invention relates to magnetic recording devices in general and, more specifically, to an apparatus for positioning a magnetic head relative to the tracks of a tape.

2. Description of Related Art

High-density recording on multiple tracks of a magnetic tape is known. In certain arrangements, parallel tracks extend along a longitudinal direction of the magnetic tape. A magnetic tape is moved transversely across the tape so that a read and/or write gap of the magnetic head is moved in proximity to the desired track. During recording or playback, the head needs to stay in position as the tape moves in a longitudinal direction across the read/write gap.

There continues to be increasing demands for greater storage capacity, which has jumped from a few gigabytes to several hundred gigabytes. Magnetic tape systems are still among the most economical devices for storing data.

Existing tape storage systems with a few gigabytes of capacity have very limited track densities and bit densities. In those existing systems, during read and/or write functions, the head positioner locates the head at the track's centerline and the read/write process continues without any adjustment, even should the head gap become offset from the track's centerline. Some existing tape storage systems contain a mechanism that precisely allows the read/write head to be located precisely at the track's centerline as the tape at the beginning of the read/write process. Once the read/write process begins, there is no correction if an offset should arise between the head and the centerline of the track.

To increase storage capacities to meet increased demands, track density, which is the number of tracks per distance (e.g., inches), should be increased. As track density increases, the track pitch and width decrease. For proper read/write operation, the magnetic head must stay at, or very near, the centerline of the track.

Due to reduced track pitch, improvements to the head positioner are needed to minimize the offset between the head and the centerline of the track. One important feature of such a positioner is that it allows the drive to monitor the head-to-track relationship. If the drive determines that the head and track are offset, then the positioner corrects the relative position to maintain the relationship between the head and the centerline of the track.

There are two basic types of head positioners—open loop positioners and closed loop positioners. Conventional open loop positioners do not have a mechanism for ensuring that the head stays in a close relationship with the centerline of the track. An open loop positioner moves the magnetic head to a track location and does not move the magnetic head again, even if the head becomes offset with respect to the track centerline. Such open loop positioners, or coarse positioners, are often found in tape systems having relatively low track densities.

Closed loop positioners are often used in tape systems having higher track densities. In high density tape systems, the tape may wander in the lateral direction as it moves in the longitudinal direction, which results in an offset between the magnetic head and the track centerline. To avoid these types of problems, tape cartridges for high density tape drives are preformatted with information, often called servo information, that is used to maintain the correct lateral position of the tape with respect to the magnetic head. The servo information provides the system with feedback to communicate to the system the continuous position of the tape. The servo information can alert the system about the occurrence of an offset. Based on the information that an offset has occurred, the head is moved by a positioner to the centerline of the track so that the read/write operation can occur properly.

Closed loop positioners use "fine positioners" to move the head during the read/write operation. These fine positioners are used to maintain the position of the head at the centerline of the track under a closed loop servo control using the preformatted servo information on the tape. Fine positioners include a head-carriage assembly, which comprises a magnetic head, a top head carriage, a voice coil motor, and a bottom head carriage.

SUMMARY OF THE INVENTION

There is a need for an improved head positioner that allows for increased track densities.

There is a need a need for an improved head positioner that ensures that the magnetic read/write head is at the tape centerline throughout the read/write operation.

There is a also a need for a suspension system that contains a flexure that ensures that the natural frequencies of the mass-spring system are typically lower than 200 Hz.

There is a further need for an improved head positioner suspension system that contains a flexure that maintains a stiffness at a minimum level so that the current required to move the magnetic head assembly in a transverse direction is low.

These and other needs of the invention are met by an embodiment of the invention which provides a head positioning apparatus for positioning a magnetic head in a multi-track tape drive. The apparatus comprises a voice coil having an interior space. A movable carriage supports the magnetic head and the voice coil and a center magnetic pole is housed in the interior space of the voice coil. A pair of outer magnetic poles are positioned opposite each other about an exterior of the voice coil. First and second flexures are each attached at opposing ends to the outer magnetic poles and in a central portion to the movable carriage.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects. Accordingly, the drawings and description are to be regarded as illustrative in nature, and not as restrictive.

BRIEF DESCRIPTION OF THE DRAWINGS

The following detailed description of the embodiments of the present invention can best be understood when read in conjunction with the following drawings, in which.

DETAILED DESCRIPTION OF THE PREFERRED EMBODIMENTS

Figure 1:
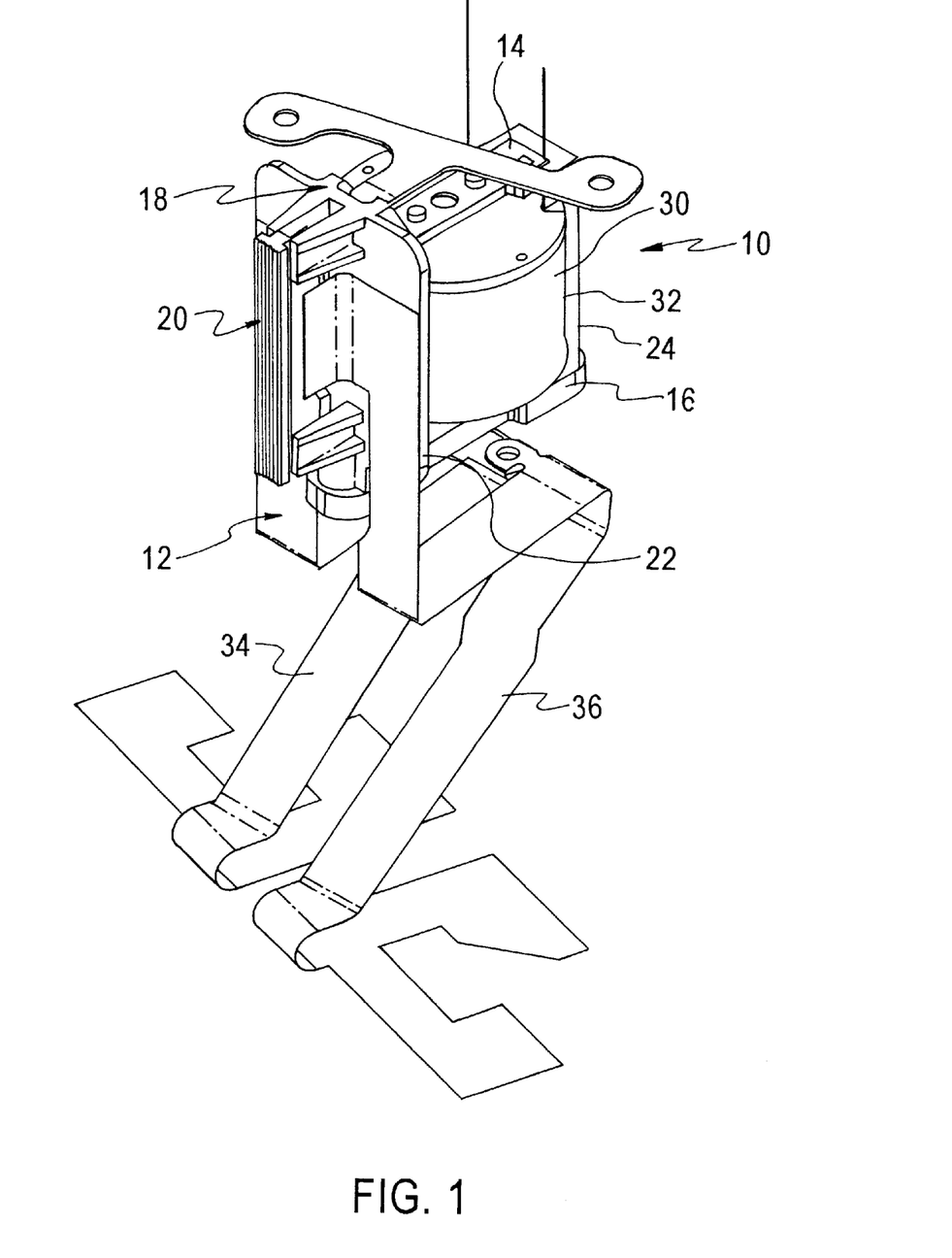
FIG. 1 is a perspective view of a head-carriage assembly according to an embodiment of the invention.

Referring now to the drawings and initially to FIG. 1, there will be seen a head-carriage assembly 10. The head-carriage assembly comprises a head carriage 12, which includes a top carriage 14 and a bottom carriage 16. A forked-shaped portion 18 extends from the head carriage 12 and holds a magnetic head 20 in place. The head-carriage assembly 10 also has a pair of vertical walls 22, 24 that extend between the top and bottom carriages 14, 16, respectively. The bottom carriage 16 connects the two vertical walls 22, 24 and is attached to the top carriage with screws 26, 28. (visible in FIG. 3).

A voice coil 30 is attached to the head carriage 12 at a locating feature (not shown), which locates the voice coil 30 inner diameter. The voice coil 30 is also attached to the two vertical walls 22, 24 via an adhesive 32. There are also two flexible printed circuits 34, 36 that electrically connect the magnetic head 20 to the main printed circuit board (not shown) of the tape drive.

The group of components of FIG. 1 (except for the flexible printed circuits 34, 36) forms the head-carriage assembly 10 and is considered to comprise the total mass of the system under consideration. This mass is able to translate or move a limited distance during the read/write process so that the magnetic head 20 is always located properly with respect to a tape track centerline that is being read or written. The movement of the mass is performed under a closed-loop servo control process.

The basic construction of the magnetic head 20 is known to one of ordinary skill in the art and, therefore, will not be described at this point. However, limited detail includes two head rails, each of the head rails having multiple read/write gaps and multiple servo-heads. In the magnetic head 20 of the embodiment of FIG. 1, each rail has eight read/write gaps and two servo heads.

Figure 2:
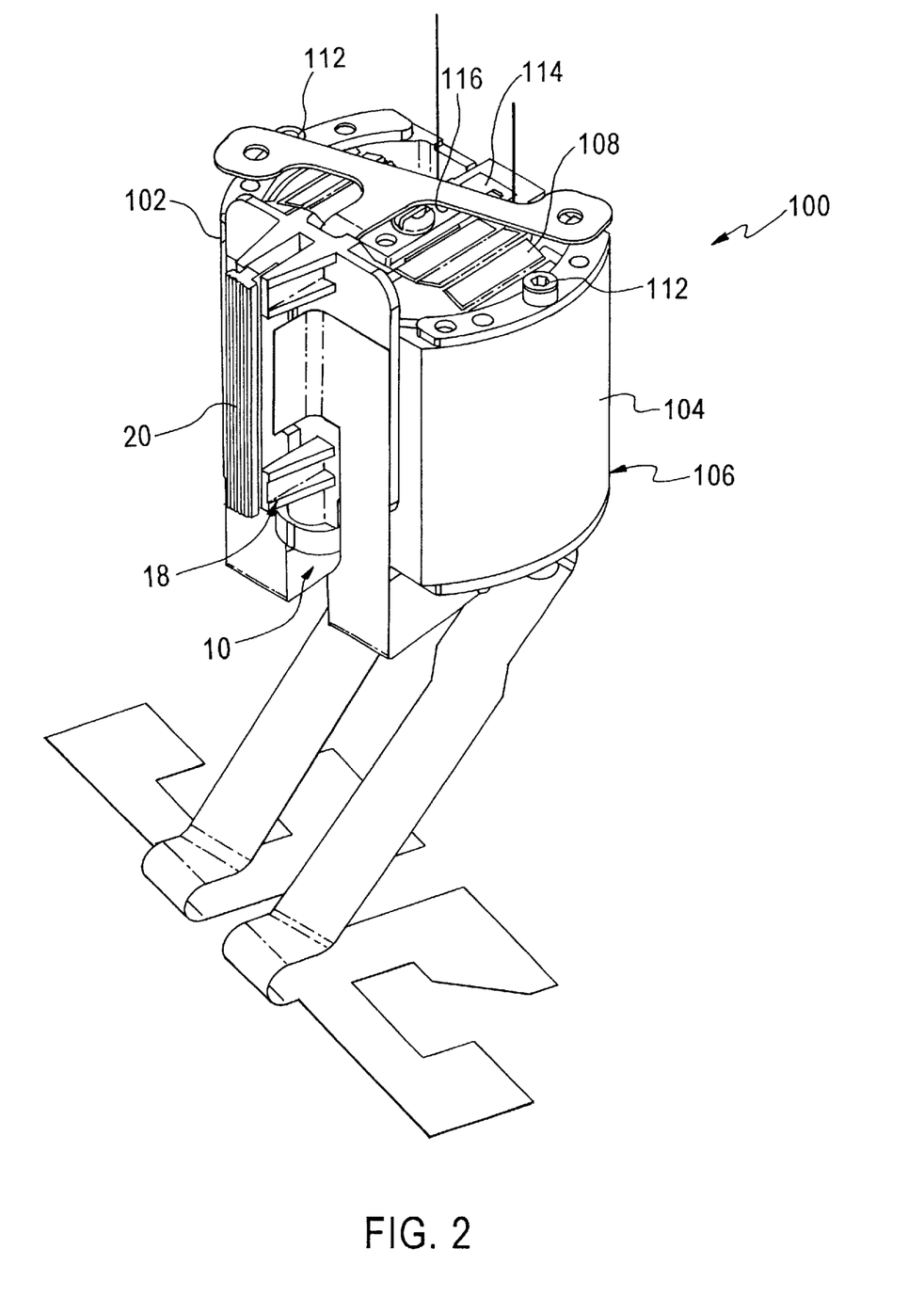
FIG. 2 is a perspective view of a fine positioner assembly with the flexures according to the invention.

FIG. 2 shows a fine positioner 100 according to the invention for use with the invention of FIG. 1. The voice coil 30 of the head-carriage assembly 10 is surrounded on its periphery by first and second portions 102, 104 of an outer magnetic pole 106. A first flexure 108 of a pair of first and second flexures 108, 110, which form the suspension system for the head-carriage assembly 10, is shown on the top of the fine positioner 100. The first and second flexures 108, 110 will be described in more detail later in FIG. 4. The first flexure 108 is connected to the outer magnetic pole 106 via screws 112 and to the top carriage 14 via center clamp 114 and screw 116. The screws 112, 116 may be replaced with an adhesive placed between the outer magnetic pole 106, and/or the top carriage 14 and the center clamp 114, and the first flexure 108.

Figure 3:
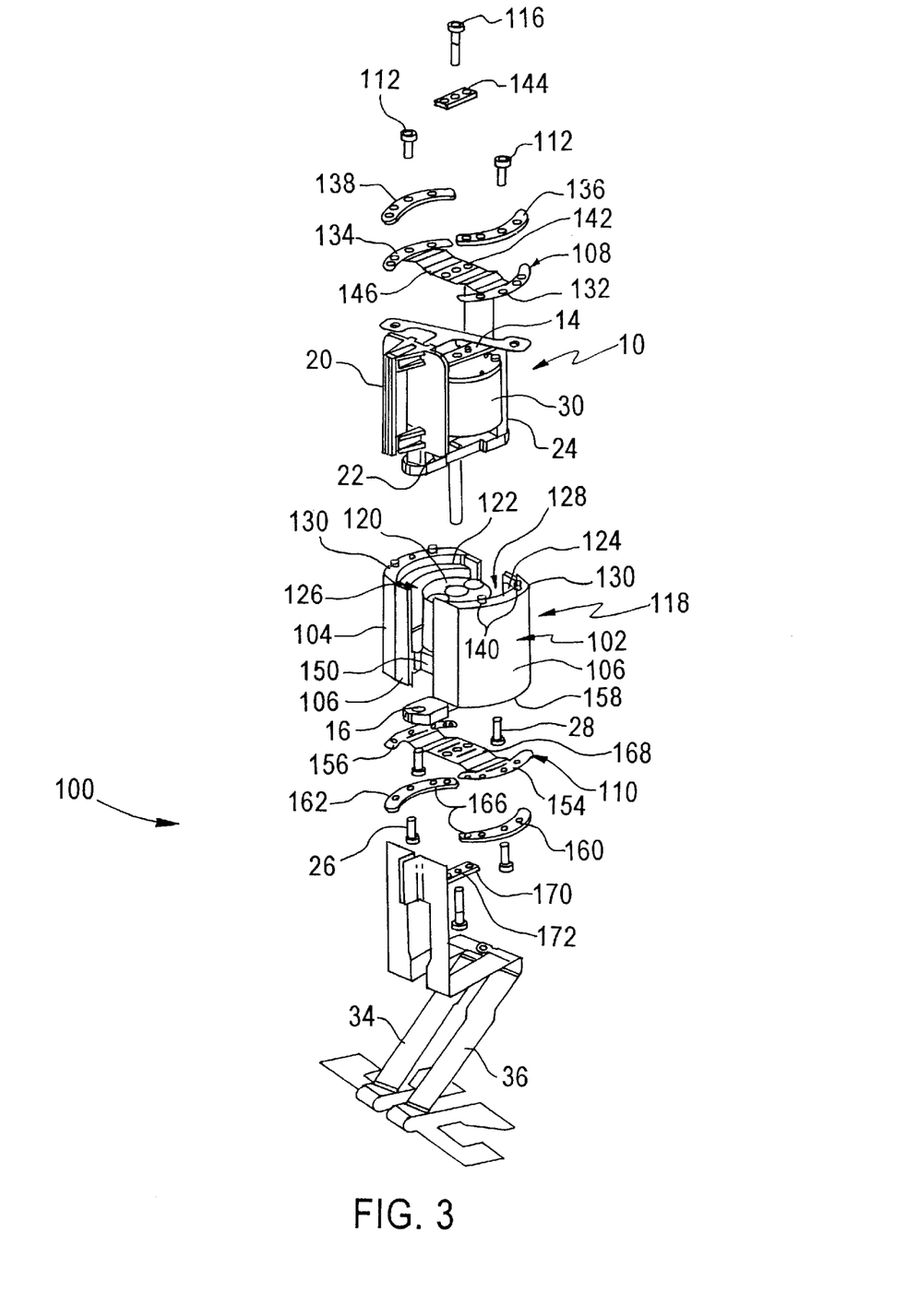
FIG. 3 is an exploded view of the fine positioner of FIG. 2.

A more detailed view of the fine positioner 100 is shown in the exploded view of FIG. 3. The head-carriage assembly 10 is depicted in a partially disassembled state. The voice coil 30, vertical walls 22, 24, and magnetic head assembly 20 are shown separated from the bottom carriage 16 and the printed circuits 34, 36.

A magnetic core assembly 118, which comprises both portions 102, 104 of the outer magnetic pole 106, a center magnetic pole 120, and radially magnetized neodynium magnets 122, 124, is provided. The outer magnetic pole 106, center magnetic pole 120 and magnets 122, 124 form radial magnetic gaps 126, 128. The center magnetic pole 120 is placed in the inner diameter of the voice coil 30. On one side of the voice coil 30 is magnet 122 and, on the other side of the voice coil 30, is magnet 124.

As shown, there are a pair of first and second flexures 108, 110 disposed on either end of the head-carriage assembly 10. The two flexures 108, 110 form the suspension system for the head-carriage assembly 10.

The first flexure 108 is attached to the top edge or surface 130 of each of the portions 102, 104 of the outer magnetic pole 106. The first flexure 108 is secured at each of its arcuate ends 132, 134 to the top surfaces 130 of the outer magnetic pole 106 via clamps 136, 138 and screws 112. The clamps 136, 138 are used so that the force provided by screws 112 is distributed over the entirety of the arcuate ends 132, 134 of the first flexures 108, thereby ensuring that the force is not concentrated at a single point. In the embodiment shown, the top surfaces 130 of the outer magnetic pole 106 have a plurality of locating features 140 that mate with a plurality of holes in the clamps 136, 138 and the arcuate ends 132, 134 of the first flexure 108.

A central portion 142 of the first flexure 108 is attached to the top carriage 14 via a center clamp 144. The central portion 142 is placed over the top carriage 14; the center clamp 144 is placed over the central portion 142 of the first flexure 108 and a screw 116 is inserted through the screw hole 146. As shown, the top carriage 14 also has a plurality of locating features 148 that allow the center clamp 144 and the first flexure 108 to be located more easily in the proper position with respect to the top carriage 14. The center clamp 144 is employed to distribute the attachment force from screw 116 across the width of the central portion 142 so that the force is not concentrated at essentially a single point.

As shown, the bottom carriage 16 is separated from the remainder of the head-carriage assembly 10 by a connector 150 that connects the outer magnetic pole 106 with the center magnetic pole 120. The bottom carriage is connected to the remainder of the head-carriage assembly 10 via a pair of self-threading screws 152.

The second flexure 110 is attached to the outer magnetic pole 106 and the head-carriage assembly 10 in manner that is very similar to the manner in which the first flexure 108 is connected to the outer magnetic pole 106 and the head-carriage assembly 10. The arcuate outer ends 154, 156 of the second flexure 110 are attached to the bottom edge or surface 158 of the portions 102, 104 of the outer magnetic pole 106 via clamps 160, 162 and screws 112. The clamps 160, 162 are used so that the force provided by screws 112 is distributed over the entirety of the arcuate ends 154, 156 of the second flexure 110, thereby ensuring that the force is not concentrated at a single point. In the embodiment shown, the bottom surfaces 158 of the outer magnetic pole 106 have a plurality of locating features 164 that mate with a plurality of holes 166 in the clamps 160, 162 and the arcuate ends 154, 156 of the second flexure 110.

A central portion 168 of the second flexure 110 is attached to the bottom carriage 16 via a center clamp 170. The central portion 168 is placed over the bottom carriage 16; the center clamp 170 is placed over the central portion 168 of the second flexure 110 and a screw 116 is inserted through the screw hole 172. As shown, the bottom carriage 16 also has a plurality of locating features 174 that allow the center clamp 170 and the second flexure 110 to be located more easily in the proper position with respect to the bottom carriage 16. The center clamp 170 is employed to distribute the attachment force from screw 116 across the width of the central portion 168 so that the force is not concentrated at essentially a single point.

As a result of the above construction, the first and second flexures 108, 110 are secured to, and essentially fixed with respect to, the outer pole 106. The respective central portions 142, 168 of the first and second flexures 108, 110 are secured to the head-carriage assembly 10 and are free to translate in the transverse or Z direction in response to forces emanating from the voice coil 30.

As shown, the head-carriage assembly 10 acts as a mass and the first and second flexures 108, 110 act as a spring in a mass-spring system. Mass-spring systems have associated resonance frequencies, which, in this case, are a function of the flexure design. During fine positioning, which is necessary when a relative displacement occurs between a track centerline and the magnetic head 20, the magnetic head 20 must be moved so that the correct position of the head 20 can be maintained with respect to the track centerline.

The flexures 108, 110, however, have a stiffness that opposes the motion of the head-carriage assembly 10. The flexures according to the invention are designed to minimize the force required to deform the flexures 108, 110 in the z-direction, which deformation allows the head-carriage assembly 10 to translate in the z-direction. The flexures 108, 110 according to the invention, provide a frequency response of the mass-spring system having a 1st mode of resonance at about 100 Hz. The second, third, and subsequent resonance frequencies are reduced and are not significant. These resonance characteristics provide a very stable servo control loop.

Figure 4:
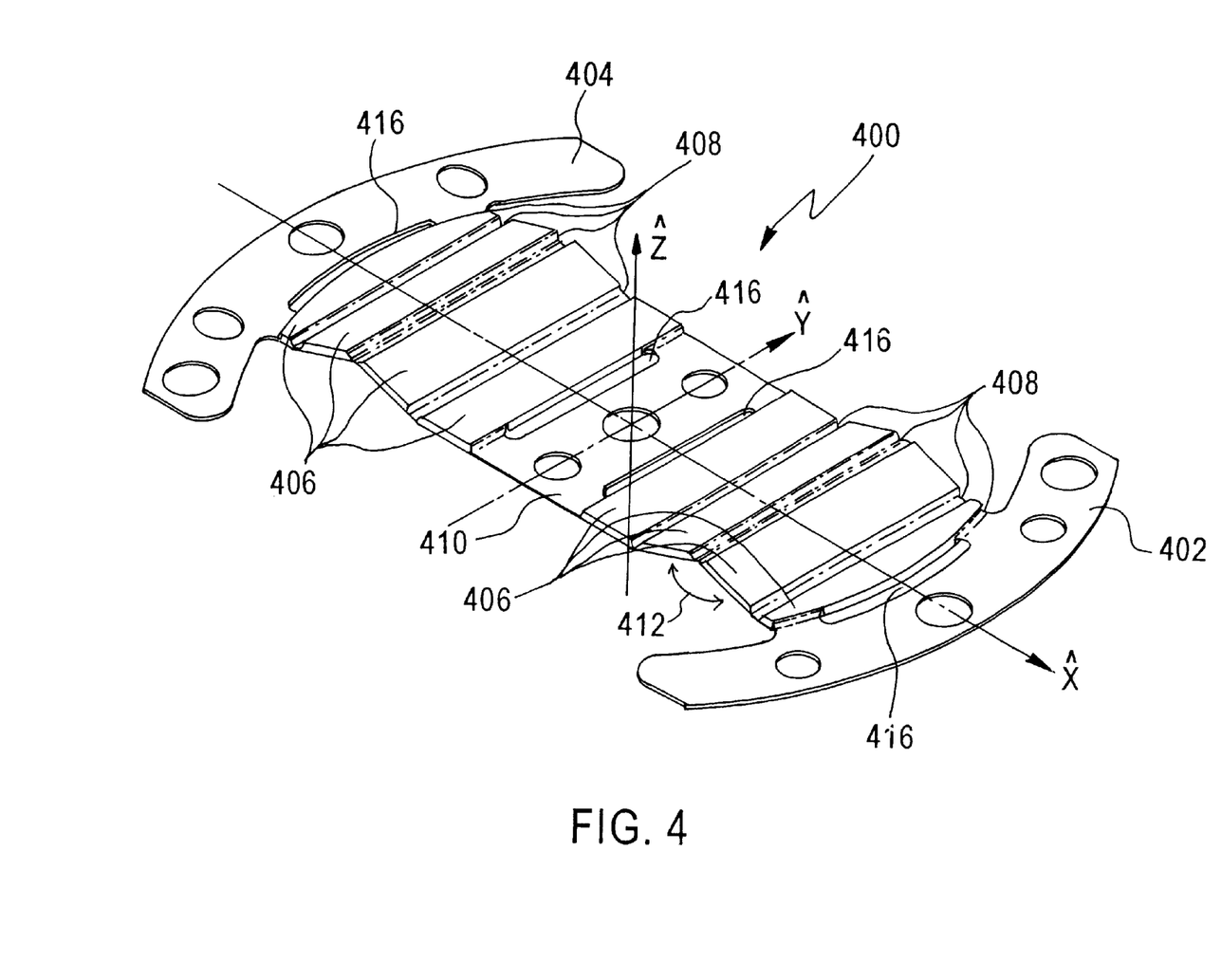
FIG. 4 is a view of a flexure according to the invention.

As shown in FIG. 4, a flexure 400 has opposing arcuate ends 402, 404 that are arcuate or semi-circular in shape. The overall thickness and width of the flexure 400 are chosen to maintain the low stiffness in the z-direction, to provide the 1st mode of resonance of the mass-spring system at the desired level of about 100 Hz, and to provide high stiffness along the torsion axis. The thickness of the embodiment of FIG. 4 is 0.1 mm to 0.15 mm and the raised portion is 0.4 mm to 0.6 mm. The width of the embodiment of FIG. 4 ranges from 15 to 25 mm. The flexure may be made of different materials, such as stainless steel, aluminum, composite materials, etc.

The flexure 400 has a series of alternating increased thickness areas 406 and reduced thickness areas 408. In the approximate center of the flexure 400, a central reduced thickness area 410 is provided. The increased thickness areas 406 serve to provide torsional rigidity for the flexure 400.

The flexure 400 has 2 V-shapes 412 with the increased thickness areas 406 forming the sides of the V-shape 412 and one of the reduced thickness areas 408 forming the apex of the V-shape 412. The V-shape 412 with the reduced thickness area 408 at the apex provide the small amount of stretch in the x-direction that is necessary for the flexure to translate in the z-direction. The interior angle of the apex is preferably 18 degrees in a static condition.

The flexure 400 also has a plurality of slots 416. One slot 416 is located adjacent each arcuate end 402, 404 and covers about 50% of the width of the flexure. These slots 416 are also arc-shaped. There are also two more slots 416 that lie between the central reduced thickness area 410 and the adjacent increased thickness area 406. The purpose of slots 416 is to reduce stiffness along the z-axis.

Each of the arcuate ends and the central reduced thickness area 410 is provided with a plurality of mounting holes 418, which are used to mount the flexure 400 to the outer magnetic pole 106 and the top or bottom carriage 14, 16.

Thus, proceeding from left to right in the x-direction, the flexure 400 has an arcuate end 402 joined to a reduced thickness area 408 and slot 416, the reduced thickness 408 area being positioned on either side of the slot 416 in the y-direction. Adjoining this point is an increased thickness area 406, then a reduced thickness area 408, then an increased thickness area 406. The increased and reduced thickness areas 406, 408 continue to alternate until the central reduced thickness area 410. A series of V-shapes 412 are formed, the open portion of the V being alternated up in the y-direction, then down in the y-directions, and so forth. Adjacent the central reduced thickness area 410 is a reduced thickness 408 and slot 416 combination. The other side of the central reduced thickness area 410 is a mirror image of the side to the left of the central reduced thickness area 410.

The stiffness in the z-direction is maintained by providing the 4 slots and the reduced thickness areas 408. The stiffness in the y-direction is increased, which is a result of the thickness of the increased thickness areas 406 being three times thicker than the thickness of the regions near the 4 slots, to prevent the torsional motion of the suspension system and, in turn, reducing unwanted resonance. The V-shaped portions 414 with the reduced thickness areas at their apexes allow the flexure 400 to stretch slightly in the x-directions as the flexures translate in the +/- z-direction during fine positioning. This provides greater travel at less current and also provides a lower first mode of resonance.

Figure 5A:
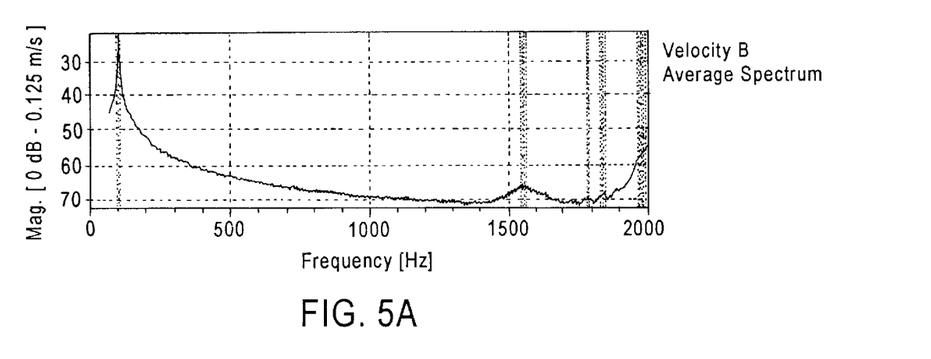
FIGS. 5(a)–5(b) show frequency response plots of a fine positioner containing the flexures according to the invention.
Figure 5B:
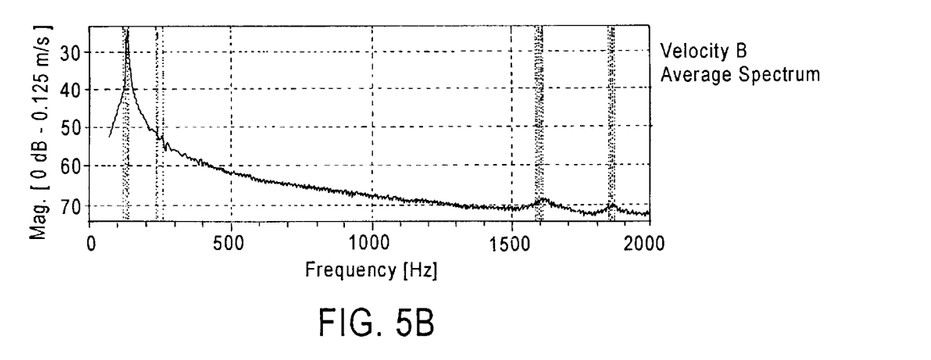
Figure 5C:
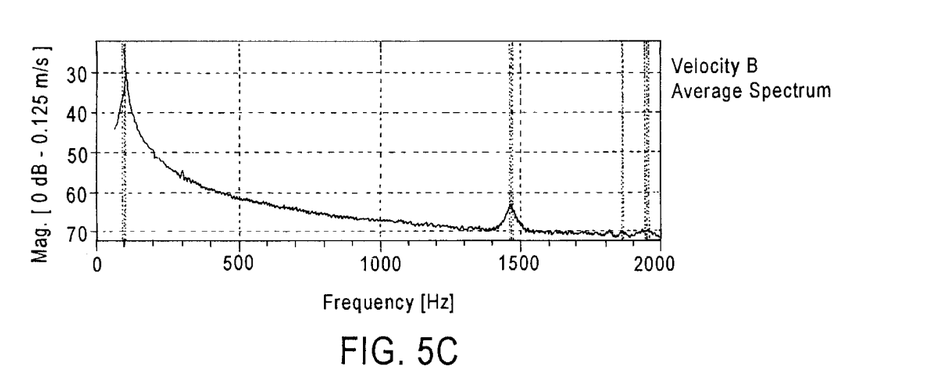

FIG. 5 shows a series of frequency response plots, or bode plots, of a spring-mass system having flexures designed as shown in FIG. 4. Bode plots provide gain and phase data of the system versus a range of frequencies (typically from 10 to 2000 Hz). Bode plots provide information about system stability. The 1st frequency mode occurs at approximately 100 Hz with the remaining frequency modes occurring beyond the allowable frequency range of 1500 Hz.

In a fine positioner according to the invention, one component is the head-carriage assembly 10. The head-carriage assembly 10 includes the magnetic head 20, the top head carriage 14, a voice coil 30 and a bottom head carriage 16. The head-carriage assembly 10 is supported between two flexures 108, 110 such that the voice coil assembly is in a radial magnetic flux, which is generated by the magnetic poles of voice coil motor. As a result, the head-carriage assembly 10 is suspended by the two flexures 108, 110 and is driven by the voice coil motor.

According to the invention, the magnetic head 20 is supported between two flexures 108, 110 such that the voice coil 30 is in a radial magnetic flux, which is generated by the magnetic poles of the voice coil motor. As a result, the head-carriage assembly 10, which is made up of a magnetic head 20, a top carriage 14, a voice coil 30, and a bottom carriage 16, is suspended between two flexures 108, 110. The moving mass formed by such a construction is driven by the voice coil motor to move the magnetic head 20 so that it maintains its position at the track centerline.

During the read/write process, the magnetic head 20 is moved to the required track centerline. As the tape is moved along the head-carriage assembly 10, the servo head reads the pre-formatted servo information from the "servo track" and the eight tracks are written or read simultaneously. If there is any disturbance in the tape path in the transverse direction as the tape is wound, which results in the head gaps being dislocated from the centerline, then the servo head detects an error. The servo head also detects a distance, delta, by which the gaps are dislocated from the centerline and an error signal is derived. The error signal is processed by the tape drive to derive a proportional current, which is applied to the voice coil 30. As a result of the proportional current, the voice coil moves the head back to the centerline.

When moving the magnetic head 20 to keep it at the centerline of the track, the current in the voice coil 30 must have a certain calculated value. The current must be sufficient to overcome the stiffness of the flexures 108, 110 in the translation direction, the mass moment of inertia of the head-carriage assembly 10, and the stiffness of the other components (e.g., the head flexible printed circuits).

Moreover, to maintain the power dissipative effect of the fine postioner at a low level, the maximum current level in the fine positioner must be kept to a very low level. Also, the moving mass of the fine positioner must be as small as possible, which results in reduced inertia of the system. As a result of the reduced inertia of the fine positioner system, a lower force is required to accelerate the mass of the system. The other force involved is the mass of the positioner against the stiffness of the flexures.

The design of the flexures according to the invention creates a minimum stiffness in the transverse direction, so that the current required to move the mass in a transverse direction is very low. As the stiffness is lowered in the direction of head travel, the design of the flexures maintains a maximum stiffness in the other directions so that the position of the voice coil in the center of the magnetic gap is maintained. Also, the design of the flexures, which act as springs in a mass-spring system with the head-carriage assembly, maintains the natural frequencies at the required levels to avoid failure of the servo system. Most importantly, the design of the flexures minimizes resonances at frequencies higher than the fundamental frequency.

In this disclosure there is shown and described only the preferred embodiment of the invention and but a few examples of its versatility. It is to be understood that the invention is capable of use in various other combinations and environments and is capable of changes or modifications within the scope of the inventive concept as expressed herein.

What is claimed is:

1. A magnetic recording device comprising:
    a magnetic read/write head; and
    means for positioning the read/write head with respect to a magnetic recording medium.

2. A head positioning apparatus for positioning a magnetic head in a multi-track tape drive, the apparatus comprising:
    a voice-coil having an interior space;
    a movable carriage supporting the magnetic head and the voice coil;
    a center magnetic pole housed in the interior space of the voice coil;
    a pair of outer magnetic poles positioned opposite each other about an exterior of the voice coil; and
    first and second flexures positioned at opposite ends of the outer magnetic poles, each of said flexures being attached at opposing ends to the outer magnetic poles and at a central portion to the movable carriage.

3. A head positioning apparatus as claimed in claim 2, wherein each of the first and second flexures have a plurality of slots.

4. A head positioning apparatus as claimed in claim 3, wherein each of the first and second flexures have one slot near where the first and second flexures are attached to the outer magnetic poles.

5. A head positioning apparatus as claimed in claim 4, wherein each of the first and second flexures have a pair of slots positioned opposite each other about the area where the first and second flexures are attached to the movable carriage.

6. A head positioning apparatus as claimed in claim 5, wherein the first and second flexures each have a plurality of reduced thickness areas, wherein the first and second flexures each have a plurality of increased thickness areas, and wherein each of the increased thickness areas is positioned between adjacent ones of the reduced thickness areas.

7. A head positioning apparatus as claimed in claim 6, further comprising a plurality of clamps, wherein one of the plurality of clamps is used to clamp the arcuate end of the first and second flexures to the outer magnetic pole.

8. A head positioning apparatus as claimed in claim 7, further comprising a pair of center clamps, wherein one of the pair of center clamps is positioned over a central portion of each of the first and second flexures to clamp the central portion to the movable carriage.

9. A head positioning apparatus as claimed in claim 8, wherein each of the ends of the outer magnetic poles and the movable carriage have a plurality of locating features inserted into holes in the first and second flexures.

10. A head positioning apparatus as claimed in claim 2, wherein the first flexure is attached to a top portion of the movable carriage and top edges of the outer magnetic poles, and wherein the second flexure is attached to a bottom portion of the movable carriage and bottom edges of the outer magnetic poles.

11. A head positioning apparatus as claimed in claim 10, wherein each of the first and second flexures have a plurality of slots.

12. A head positioning apparatus as claimed in claim 11, wherein each of the first and second flexures have one slot near where the first and second flexures are attached to the outer magnetic poles.

13. A head positioning apparatus as claimed in claim 12, wherein each of the first and second flexures have a pair of slots positioned opposite each other about the area where the first and second flexures are attached to the movable carriage.

14. A head positioning apparatus as claimed in claim 13, wherein the first and second flexures each have a plurality of reduced thickness areas, wherein the first and second flexures have a plurality of increased thickness areas, and wherein each of the increased thickness areas is positioned between adjacent ones of the reduced thickness areas.

15. A head positioning apparatus as claimed in claim 14, further comprising:
    a pair of clamps, each clamp being disposed about the opposite arcuate ends of the first and second flexures to clamp the arcuate ends of the first and second flexures to the outer magnetic pole; and
    a pair of center clamps, each being positioned over a central portion of the first and second flexures to clamp each central portion to the movable carriage.

16. A head positioning apparatus as claimed in claim 15, wherein each of the ends of the outer magnetic poles and the movable carriage have a plurality of locating features inserted into holes in the first and second flexures.

17. A head positioning apparatus as claimed in claim 16, further comprising an adhesive disposed between the first and second flexures and the outer magnetic poles.

18. A multi-track tape drive, comprising:

a housing;

a magnetic head disposed in the housing; and a head positioning apparatus coupled to the magnetic head, the head positioning apparatus comprising:
- a voice-coil having an interior space;
- a movable carriage supporting the magnetic head and the voice coil;
- a center magnetic pole housed in the interior space of the voice coil;
- a pair of outer magnetic poles positioned opposite each other about an exterior of the voice coil; and
- first and second flexures positioned at opposite ends of the outer magnetic poles, each of said flexures being attached at opposing ends to the outer magnetic poles and at a central portion to the movable carriage, wherein each of the first and second flexures comprises:
  - opposing arcuate shaped ends;
  - a plurality of alternating reduced thickness areas and increased thickness areas;
  - a central reduced thickness area at the central portion of the flexures; and
  - a plurality of slots, wherein one of the slots is located between each end and its adjacent reduced thickness area and wherein one of the slots is located on each side of the central reduced thickness area.

19. A multi-track tape drive as claimed in claim 18, further comprising:

- a pair of clamps, each clamp being disposed about the opposite arcuate ends of the first and second flexures to clamp the arcuate ends of the first and second flexures to the outer magnetic pole; and
- a pair of center clamps, each being positioned over a central portion of the first and second flexures to clamp each central portion to the movable carriage.

20. A multi-track tape drive as claimed in claim 19, wherein each of the ends of the outer magnetic poles and the movable carriage have a plurality of locating features inserted into holes in the first and second flexures.

* * * * *